(12) United States Patent
Puranik

(10) Patent No.: US 8,122,177 B1
(45) Date of Patent: Feb. 21, 2012

(54) DIRECT MEMORY ACCESS TECHNIQUE FOR USE WITH PCIE ENDPOINTS

(75) Inventor: Kiran S. Puranik, Fremont, CA (US)

(73) Assignee: Xilinx, Inc., San Jose, CA (US)

( * ) Notice: Subject to any disclaimer, the term of this patent is extended or adjusted under 35 U.S.C. 154(b) by 281 days.

(21) Appl. No.: 12/468,340

(22) Filed: May 19, 2009

(51) Int. Cl.
*G06F 13/28* (2006.01)
(52) U.S. Cl. ........................... 710/308; 710/316
(58) Field of Classification Search .................. 710/308
See application file for complete search history.

(56) References Cited

U.S. PATENT DOCUMENTS

| | | | | |
|---|---|---|---|---|
| 7,287,114 | B2 * | 10/2007 | Sullivan | 710/316 |
| 7,809,870 | B2 * | 10/2010 | McDaniel | 710/105 |
| 7,912,997 | B1 * | 3/2011 | Murray | 710/22 |
| 2006/0259656 | A1 * | 11/2006 | Sullivan | 710/22 |
| 2008/0091857 | A1 * | 4/2008 | McDaniel | 710/72 |
| 2010/0332713 | A1 * | 12/2010 | Engel et al. | 710/305 |

OTHER PUBLICATIONS

Wiltgen, Jake; "Bus Master DMA Reference Design for the Xilinx Endpoint Block Plus Core for PCI Express"; Xilinx Inc; Revision 1.1; Aug. 22, 2008; all pages.*

* cited by examiner

*Primary Examiner* — Ryan Stiglic
(74) *Attorney, Agent, or Firm* — Scott Hewett; LeRoy D. Maunu

(57) ABSTRACT

An integrated circuit ("IC") includes a peripheral component interconnect express ("PCIe") root complex having a central processing unit ("CPU"), a memory controller configured to control a main memory of a PCIe system, and a PCIe port coupled to a PCIe endpoint device through a PCIe switch. The PCIe endpoint device is configured to initiate data transfer between the main memory and the PCIe endpoint device.

18 Claims, 13 Drawing Sheets

DIRECT MEMORY ACCESS TECHNIQUE FOR USE WITH PCIE ENDPOINTS

FIELD OF THE INVENTION

This invention relates generally to integrated circuits, and more particularly to techniques for transferring data between peripheral components in an integrated circuit system.

BACKGROUND

Computer systems have many protocols for transferring data between components. For example, a mother board of a computer system transfers data between the processor and peripheral components such as modems, memory, and disk drives. A common protocol used in computer systems is peripheral component interconnect ("PCI"), which is a data transfer technique using a parallel bus and common clock and control signals.

Another protocol is called PCI-express ("PCIe"), which is a serial data transfer technique using point-to-point gigabit serial input/output ("I/O"). PCIe has been shown to provide fast, bidirectional data transfer without the need for a common clock on a reduced number of lines. A PCIe system defines a root complex ("RC"), switches, and endpoints ("EPs"). The RC connects to the central processing unit ("CPU") complex, which can be a single-core or a multi-core CPU. The CPU is at the root of a tree interconnect structure. Intermediate nodes in the tree structure are implemented using switches and the leaf nodes are EPs. EPs enable data to be transferred in and out of the system memory connected to the RC by interfacing to external devices, such as a charge-coupled diode ("CCD") camera in AN IMAGE GRABBER™ card or a physical component in a network card.

PCIe applications using gigabit serial interconnects, such as those occurring in field-programmable gate arrays ("FPGAs"), incur higher latency of operation than PCIe applications using lower-payload interconnects. This is due to additional processing required to convert data available inside the FPGA into a serial stream for transmission, and the reverse process of converting a received serial stream into data that can be processed inside the FPGA. Switches added between the RC and EPs can add additional latency on the path between the EP and the RC (e.g., system memory) when additional components are connected to the FPGA PCIe system.

Higher latency between RC and EPs degrades performance of applications, especially those utilizing direct-memory access ("DMA"). This is because conventional DMA techniques depend heavily upon programmed input/output ("PIO") READ and WRITE operations to manage DMA operations. Another side effect of higher PIO latency of operation is an increase of CPU utilization, since the CPU has to wait longer for a response to PIO READ operations.

Reducing latency, increasing data transfer rate, and reducing CPU utilization in a PCIe system during DMA operations is desirable.

SUMMARY

An IC includes a peripheral component interconnect express ("PCIe") root complex having a CPU, a memory controller configured to control a main memory of a PCIe system, and a PCIe port coupled to a PCIe endpoint device through a PCIe switch. The PCIe endpoint device is configured to initiate data transfer between the main memory and the PCIe endpoint device.

DETAILED DESCRIPTION

Figure 1A:
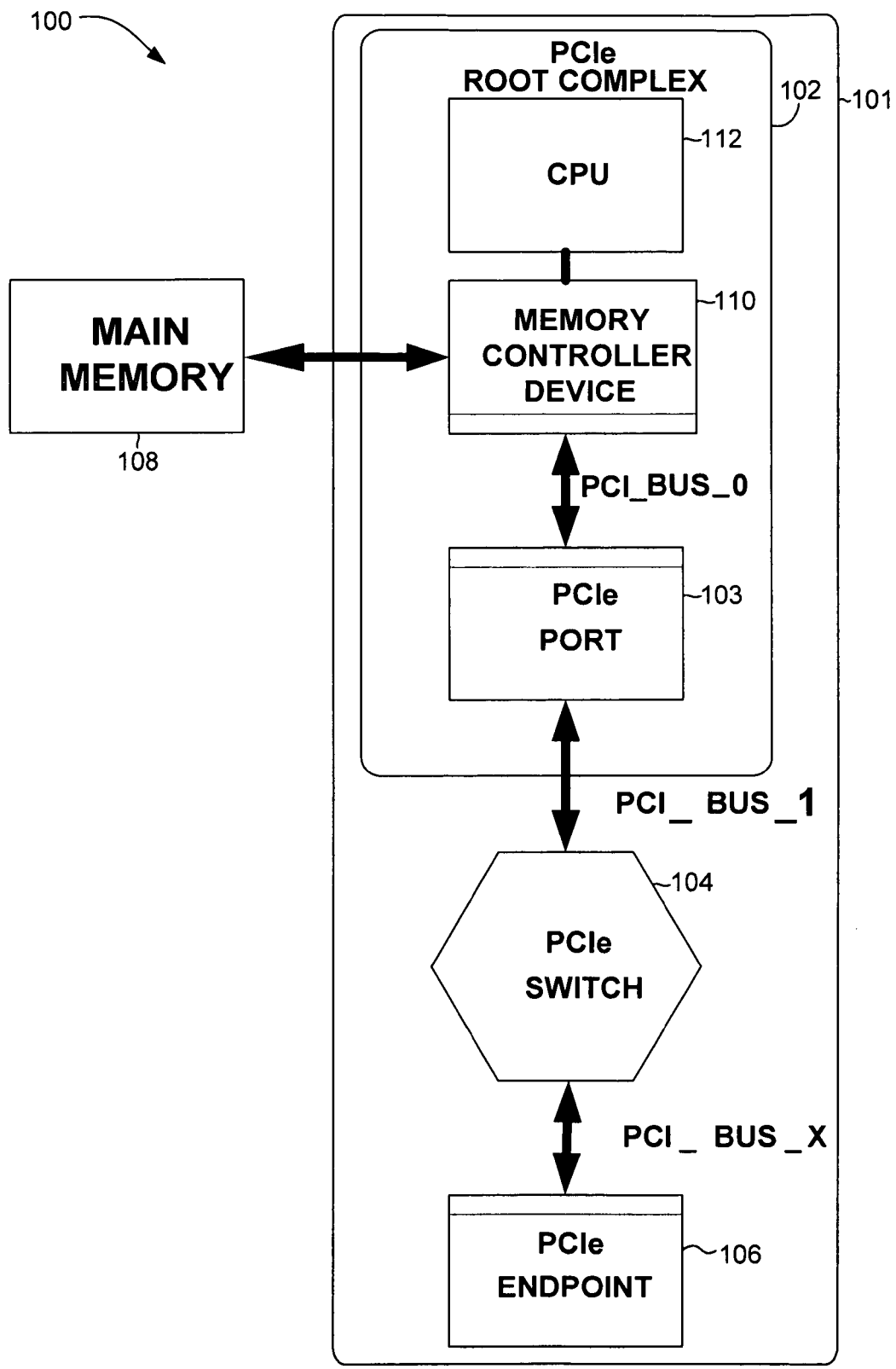
FIG. 1A shows PCI Express system components 100 according to an embodiment.

A PCIe system on an FPGA according to an embodiment eliminated the need for PIO READ operations during normal operation of the PCIe system by using a DMA technique that reduced latency. PCI Express Bus Mastering DMA performance is measured using two matrices, latency of operation and data throughput.

Latency of operation in receiving data is measured as the time it takes for received data to be transferred to the system memory via the PCIe interconnect, after it has been received on the PCI Express line card. In the transmit direction, latency of operation is measured as the time it takes to transfer a buffer from system memory to the PCIe Endpoint, once the buffer is available for transmission in the system memory.

Conventional DMA techniques suffer higher latency because they have a greater reliance on system CPU to control DMA operation. The two items that contribute to the higher latency are: a) Larger round trip delays associated with tasks such as the PIO READ transactions that system CPUs use to poll PCIe Endpoint registers or b) A larger burden on CPU bandwidth resulting from DMA tasks in a multitasking operating system environment.

An advanced bus mastering ("ABM") DMA technique according to an embodiment minimizes the use of system CPU by using FPGA endpoint DMA hardware to control data movement between system memory and the endpoint. As a result, the system CPU is able to access the descriptor information to control DMA operation using local READ and WRITE operations to system memory, which lowers overall latency of operation. To control the DMA engine, the ABM DMA techniques require the system CPU to use the PIO WRITE operations as a POSTED TRANSACTION, which means that the CPU doesn't wait for a response.

Data throughput is measured as the rate at which data can be moved from a PCI Express EP to the system memory for RECEIVE DMA operations, or from the system memory to PCI Express EP for TRANSMIT DMA operation. Conventional DMA techniques rely heavily on the system CPU, resulting in higher CPU utilization. This limits scalability of the compute or communications platform. Conventional DMA techniques also deliver lower overall data throughput because they have a greater reliance on system CPU operation to control DMA operation. The higher latency of operations associated with the use of the system CPU often becomes a data throughput performance bottleneck.

An ABM DMA technique according to an embodiment minimizes the use of the system CPU by using FPGA Endpoint DMA hardware to control data movement between system memory and the EP device. The system CPU can access the descriptor information to control DMA operation using local READ and WRITE (RECEIVE/TRANSMIT) operations to system memory, instead of higher latency PIO READ and WRITE operations. The system CPU is used to perform PIO WRITE operations to control the DMA hardware during normal operation. The system CPU utilization is further reduced because descriptor information can be accessed via system memory READ and WRITE operations. Upstream/RECEIVE and Downstream/TRANSMIT data movement processes can be completely independent procedures. Endpoint can implement any one or both depending upon the application data movement requirements. In a particular embodiment, the CPU directly polls the main memory (i.e., main system memory, see FIG. 1A, ref. num. 108) rather than I/O memory, which typically resides on the I/O device. When the DMA engine is operating the EP posts information (e.g., header and payload data) to main memory for the CPU to access when the EP device needs to share information with the CPU.

Bus-master DMA Endpoint is by far the most common type of DMA Endpoint. A bus-master DMA Endpoint contains all the logic necessary to take control of, or "master," the PCI Express bus on which it is located and to autonomously transfer data between the Endpoint's buffer and the host CPU's system memory.

FIG. 1A shows PCI Express system components 100 according to an embodiment, including a root complex 102 with a PCIe port 103 connecting the root complex 102 to a PCI Express EP device 106 through a PCI Express switch device 104 incorporated in an IC 101. Bus mastering DMA operation moves data, "upstream" from EP device 106 to the root complex 102 and main memory 108, and/or "downstream" from main memory 108 to the EP device 106. In either case the PCI Express protocol request to move the data is initiated by the EP device 106.

Endpoint bus mastering oriented upstream data movement is accomplished using posted memory transactions. Memory WRITE Transaction Layer Packets (TLPs) carry a selected number of data bytes to the address in the main memory specified in the TLP. On receipt of the TLP, the main memory controller 110 updates the targeted main memory locations.

Endpoint bus mastering oriented downstream data movement uses Non-Posted Memory and Completion transactions. In this case, the EP device 106 issues a Memory Read TLP to query a block in the main memory 108 containing a given number of bytes. On receipt of the READ TLP, the main memory controller 110 generates Completion with Data TLP/s in response. The Completion TLP/s return data associated with the queried main memory location/s.

The two bus mastering operations described above require outside entities to provide key operational information. These inputs consist of main memory location addresses and length of buffers allocated in the main memory to WRITE or READ from. This is accomplished by Programmed Input Output (PIO) write/s to the EP device 106, usually initiated by system software running on the CPU 112. For operating systems like Red Hat Linux or Windows XP requirements, such as Message Signaling Interrupt (MSI) support is required for efficient PCI Express bus mastering.

Figure 1B:
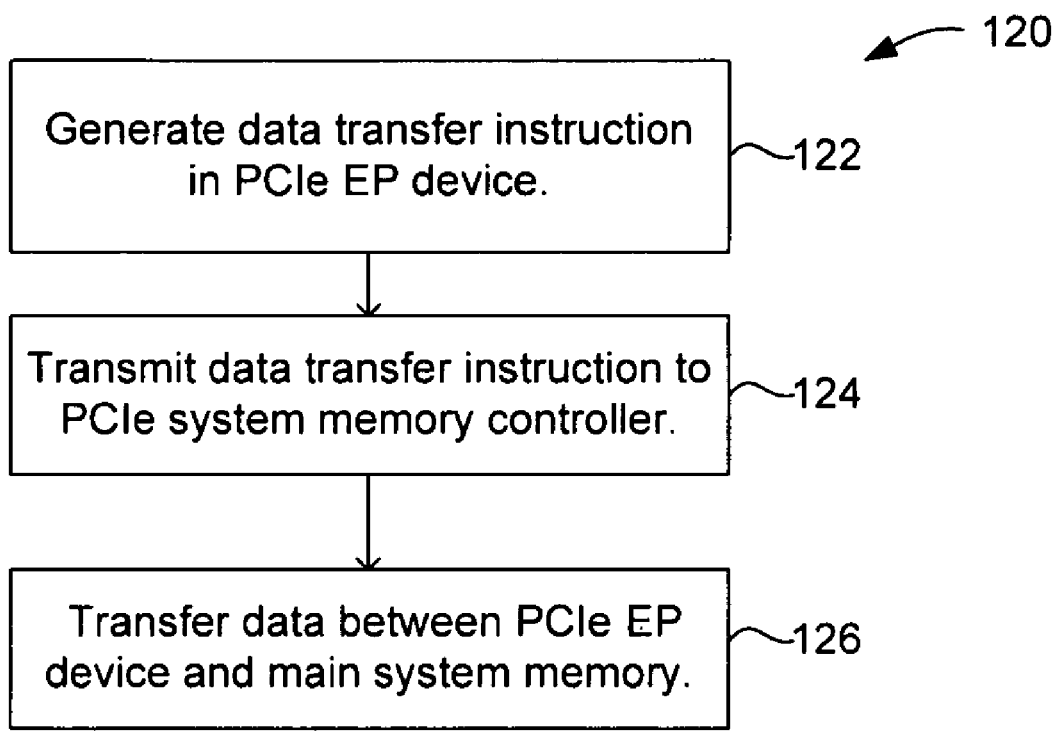
FIG. 1B is a flow chart of a method of transferring data in a PCI Express system according to an embodiment.

FIG. 1B is a flow chart of a method 120 of transferring data in a PCI Express system according to an embodiment. The PCI Express system includes a PCIe EP device in an IC, a memory controller, a CPU, and main system memory. In a particular embodiment, the IC is an FPGA and the PCIe EP device is configured in the FPGA to generate direct memory access commands. A data transfer instruction is generated in the PCIe EP device (step 122). The data transfer instruction is transmitted to the memory controller of the PCIe system (step 124) to initiate data transfer between a buffer in the PCIe EP device and the main system memory of the PCIe system (step 126). In a particular embodiment, the CPU can access description information and controls DMA operation using local READ and WRITE operations to system memory, instead of higher latency PIO READ operations. In one embodiment, the data transfer instruction is an instruction to transfer data from main system memory directly to the buffer in the PCIe EP device. In an alternative embodiment, the data transfer instruction is an instruction to transfer data directly from the buffer of the PCIe EP device to main system memory. In a particular embodiment, the data transfer instruction includes a transaction layer packet.

Figure 2:
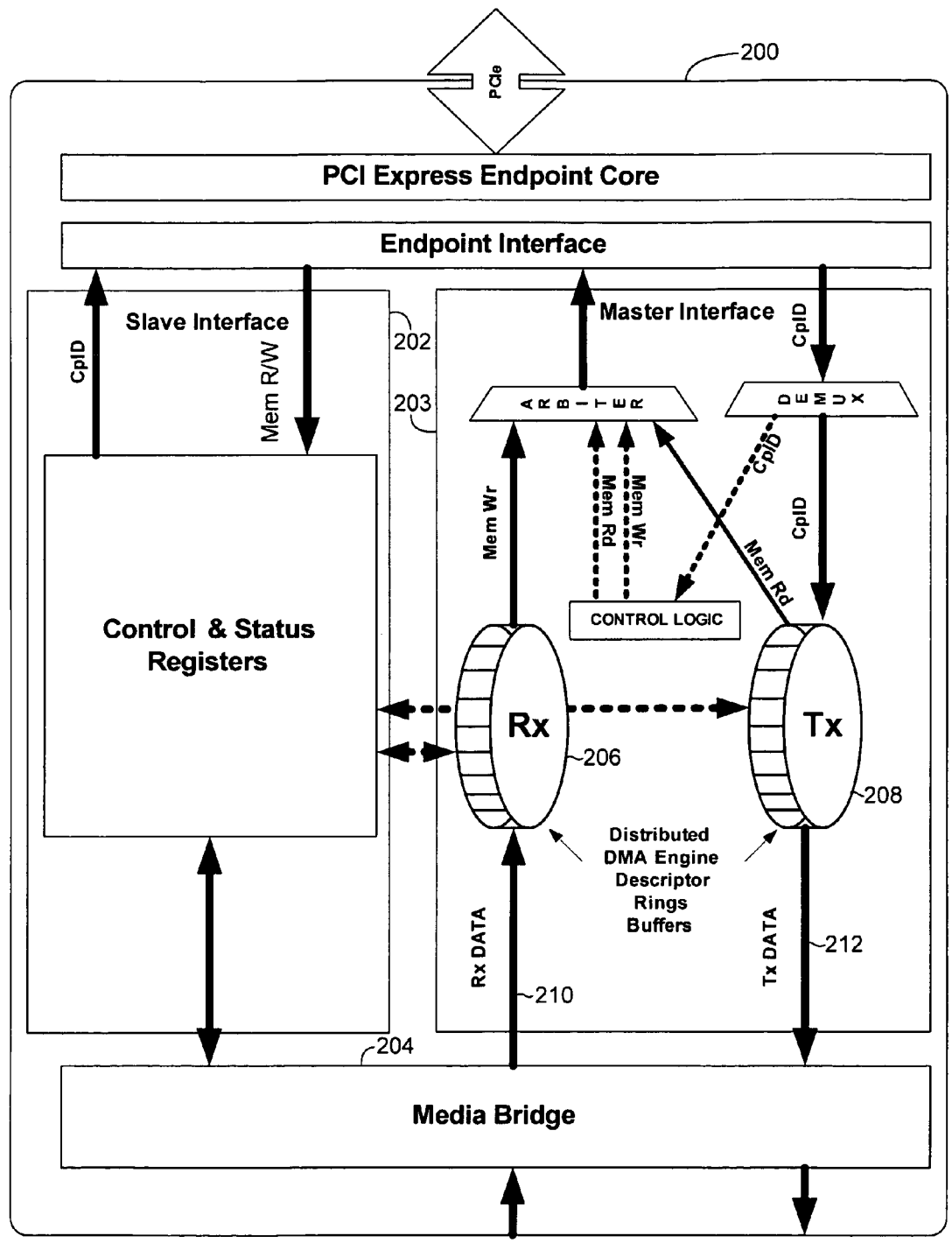
FIG. 2 shows an exemplary architecture of a PCI Express Bus Mastering capable endpoint (EP device) according to an embodiment.

FIG. 2 shows an exemplary architecture of a PCI Express Bus Mastering capable endpoint (EP device) 200 according to an embodiment. Memory WRITE and READ TLPs are steered to the slave interface 202 based on Base Address Registers claimed by these transactions. The slave interface 202 processes a memory WRITE 32 with 1 DWORD payload and responds to a memory READ instruction with a READ length of 1 DWORD with a Completion TLP, summarized in Table 1.

TABLE 1

PCI Express Transactions handled by Slave Interface

| Upstream/Downstream | Transaction | PCIe Transaction |
|---|---|---|
| Downstream | Memory Mapped Register Read | Memory Read (32b/64b) |
| Downstream | Memory Mapped Register Write | Memory Write (32b/64b) |
| Upstream | Memory Read Completion | Completion w/ Data |

The slave interface 202 enables the host CPU (not shown, see FIG. 1, ref. num. 112) to control and monitor the bus-mastering DMA hardware in the EP device 200. In one example, a device control and status register ("DCSR") has thirty-two bits divided into four bytes (bytes 0, 1, 2, 3) allocated as shown in Table 2.

TABLE 2

Device Control Register Bits

| Field | Bit(s) | Initial Value | RO/RW | Description |
|---|---|---|---|---|
| RXRST | 00 | 1 | RW | Reset Rx DMA Engine; 1'b1 = Reset |
| R0 | 03:01 | 0 | RO | Reserved; |
| RXPDUN | 04 | 0 | RW | Rx DMA Engine programming Done; 1'b1 = Done |
| R1 | 07:05 | 0 | RO | Reserved; |
| RXEN | 08 | 0 | RW | Enable Rx DMA Engine; 1'b1 = Enable |
| R2 | 11:09 | 0 | RO | Reserved; |
| RXDDUN | 12 | 0 | RO | Rx Descriptor Ring Read Operation Done; |

TABLE 2-continued

Device Control Register Bits

| Field | Bit(s) | Initial Value | RO/RW | Description |
|---|---|---|---|---|
| R3 | 15:13 | 0 | RO | Reserved; |
| TXRST | 16 | 1 | RW | Reset Tx DMA Engine; 1'b1 = Reset |
| R4 | 19:17 | 0 | RO | Reserved; |
| TXPDUN | 20 | 0 | RW | Tx DMA Engine programming Done; 1'b1 = Done |
| R5 | 23:21 | 0 | RO | Reserved; |
| TXEN | 24 | 0 | RW | Enable Tx DMA Engine; 1'b1 = Enable |
| R6 | 27:25 | 0 | RO | Reserved; |
| RXDDUN | 28 | 0 | RO | Tx Descriptor Ring Read Operation Done; |
| R7 | 31:29 | 0 | RO | Reserved; |

A thirty-two bit (four byte) READ (Rx) descriptor ring status register is allocated as shown in Table 3.

TABLE 3

Rx DMA Status Register

| Field | Bit(s) | Initial Value | RO/RW | Description |
|---|---|---|---|---|
| RXNUMD | 2:0 | Value | RO | Number of Rx Buffers Supported; Software to use for descriptor ring allocation. All inactive encodings are Reserved<br>Option  Value  No. Buffers<br>1  000  4<br>2  001  8<br>3  010  16<br>4  011  32 |
| R0 | 7:3 | 0 | RO | Reserved |
| RXMBS | 10:8 | Value | RO | Max. Buffer Size on Rx; Software to use to allocate buffers corresponding to descriptor ring elements. All inactive encodings are Reserved.<br>Option  Value  MBS(B)<br>1  000  128<br>2  001  256<br>3  010  512<br>4  011  1024<br>5  100  2048<br>6  101  4096 |
| R1 | 15:11 | 0 | RO | Reserved |
| RXOSTD | 19:16 | Value | RO | Max. no. of Outstanding Non Posted Reqs; |
| R2 | 31:20 | 0 | RO | Reserved |

A thirty-two bit (four byte) READ (Rx) descriptor ring head register is allocated as shown in Table 4.

TABLE 4

Rx Descriptor Ring Head Register

| Field | Bit(s) | Initial Value | RO/RW | Description |
|---|---|---|---|---|
| RXDRT | 4:0 | 0 | RW | Receive Descriptor Ring Tail Pointer; Updated by software to add to the free-list that limits hardware use of the descriptor ring. Software writes to this location to advertise the initial fee list and later any time received buffers have been consumed and corresponding buffers are available. Max. Value depends on RXNUMDR supported. |
| R0 | 15:5 | 0 | RO | Reserved |
| RXDRH | 20:16 | 0 | RO | Receive Descriptor Ring Head Pointer; Updated by hardware as it proceeds to use the free-list. Max. Value depends on RXNUMDR. |
| R1 | 31:21 | 0 | RO | Reserved |

Software programs the starting address of the descriptor ring structure into host memory, so hardware initiated Rx descriptor READ and WRITE-back operations can use this information as the base address to achieve a cache-line aligned copy of descriptor information from the EP device to the host main memory. Once RXPDUN is asserted, the EP device will use RXDRA, together with RXNUMDR to READ descriptor ring information from system memory into the shadow descriptor ring in the EP device. During normal operation, the EP device will use RXDRA together with an offset into the shadow descriptor ring to copy (write-back) shadow descriptor ring information to the descriptor ring in the system memory. The write-back operation is used to communicate buffer availability information to software in the device driver (typically running on the host system), based on descriptor status bits. An example of a descriptor ring address register is given in Table 5.

TABLE 5

Rx Descriptor Ring Address

| Field | Bit(s) | Initial Value | RO/RW | Description |
|---|---|---|---|---|
| RXDRA | 39:00 | 0 | RW | Rx Descriptor Ring Physical Address |
| R0 | 63:40 | 0 | RO | Reserved |

An example of an Rx descriptor ring status register is given in Table 6.

TABLE 6

Rx DMA Status Register

| Field | Bit(s) | Initial Value | RO/RW | Description |
|---|---|---|---|---|
| TXNUMD | 2:0 | Value | RO | Number of Tx Buffers Supported; Software to use for descriptor ring allocation. All inactive encodings are Reserved.<br>Option  Value  No. Buffers<br>1  000  4<br>2  001  8<br>3  010  16<br>4  011  32 |
| R0 | 7:3 | 0 | RO | Reserved |
| TXMBS | 10:8 | Value | RO | Max. Buffer Size on Tx; Software to use to allocate buffers corresponding to |

TABLE 6-continued

Rx DMA Status Register

| Field | Bit(s) | Initial Value | RO/RW | Description |
|---|---|---|---|---|
| | | | | descriptor ring elements. All inactive encodings are Reserved. |
| | | | | Option  Value  MBS(B) |
| | | | | 1      000    128 |
| | | | | 2      001    256 |
| | | | | 3      010    512 |
| | | | | 4      011    1024 |
| | | | | 5      100    2048 |
| | | | | 6      101    4096 |
| R1 | 15:11 | 0 | RO | Reserved |
| TXOSTD | 19:16 | Value | RO | Max. no. of Outstanding Non Posted Reqs; |
| R2 | 31:20 | 0 | RO | Reserved |

An example of an Rx descriptor ring head register is given in Table 7.

TABLE 7

Rx Description Head Register

| Field | Bit(s) | Initial Value | RO/RW | Description |
|---|---|---|---|---|
| TXDRT | 4:0 | 0 | RW | Transmit Descriptor Ring Tail Pointer; Updated by software to add to the work-list that limits hardware use of the descriptor ring. Software writes to this location to advertise the initial work-list and later any time transmit descriptors and corresponding buffers are ready for transmission. Max. Value depends on RXNUMDR supported. |
| R0 | 15:5 | 0 | RO | Reserved |
| TXDRH | 20:16 | 0 | RO | Transmit Descriptor Ring Head Pointer; Updated by hardware as it proceeds to process the work-list. Max. Value depends on RXNUMDR. |
| R1 | 31:21 | 0 | RO | Reserved |

Software programs the starting address of the descriptor ring structure into host memory, so a hardware-initiated Tx descriptor write-back operation can use this information as the base address to achieve a cache-line aligned copy of descriptor information from the device to the host memory. Once TXPDUN is asserted, the device will use TXDRA, together with TXNUMDR to copy (read) descriptor ring information from system memory into the shadow descriptor ring in the EP device. During normal operation, the EP device will use TXDRA together with an offset into the shadow descriptor ring to copy (write-back) shadow descriptor ring information to the descriptor ring in the system memory. The write-back operation is used to communicate buffer available information to software, based on descriptor status bits. An example of a Tx descriptor address register according to an embodiment is shown in Table 8.

TABLE 8

Tx Descriptor Ring Address

| Field | Bit(s) | Initial Value | RO/RW | Description |
|---|---|---|---|---|
| TXDRA | 39:00 | 0 | RW | Tx Descriptor Ring Physical Address |

Data is moved upstream through Receive (Rx) buffering in the EP device. Rx buffers in the master interface 203 are controlled by an Rx Descriptor Ring (DR) control structure, containing an entry per Rx buffer implemented. The media bridge 204 injects data into the Rx data buffers, the Rx DMA engine 206 creates 1 or more memory WRITE TLP/s per data descriptor/buffer and sends them upstream.

Data is moved downstream through Transmit (Tx) buffering in the EP device. Tx buffering is controlled by a Tx DR control structure containing an entry per Tx buffer implemented. When activated, the Tx DMA engine 208 creates a memory READ TLP per DR entry. The system's memory controller (see, FIG. 1, ref. num. 110) returns 1 or more Completion/s TLP/s per memory READ TLP. Data contained in received completion TLPs is stored in the Tx buffers (in Tx DMA engine 208). When the entire data set associated with a given memory READ request has been received, it is presented to the media bridge 204.

In a particular embodiment, DMA bus mastering processes are implemented in EP device application hardware. The transactions handled by the master interface (see, FIG. 2, ref. num. 203) are shown in Table 9.

TABLE 9

PCI Express Transactions handled by Master Interface

| Upstream/Downstream | Transaction | PCIe Transaction |
|---|---|---|
| Upstream | Tx Descriptor Read | Memory Read (32b/64b) |
| Upstream | Tx Descriptor Write Back | Memory Write (32b/64b) |
| Upstream | Tx Data Read | Memory Read (32b/64b) |
| Upstream | Rx Descriptor Read | Memory Read (32b/64b) |
| Upstream | Rx Descriptor Write Back | Memory Write (32b/64b) |
| Upstream | Rx Data Write | Memory Write (32b/64b) |
| Upstream | Message Signaling Interrupt | Memory Write (32b/64b) |
| Downstream | Memory Read Completion | Completion w/ or w/o Data |

An exemplary implementation supports host CPUs that can generate up to 40 bits of physical addressing. A bus mastering DMA according to an embodiment uses the following information from the PCI Express Endpoint Configuration space: 1) Cache Line Size; 2)Bus Master Enable; 3) Programmed Max_Payload_Size; 4) Programmed Max_Read_Request_Size; and 5) MSI Interrupt Enable.

A receive queue manages upstream, DMA WRITE operations, and a transmit queue manages downstream, DMA READ operations. Transmit and receive queues each support 8, 16 or 32 buffers (DEV_CSR.RXCSR.RXNUMDR or DEV_CSR.TXDCR.TXNUMDR). The number of transmit and receive buffers supported may be dissimilar. Buffers in each queue can be 128B, 256B, 512B, 1024B, 2048B or 4096B. Transmit and receive queue buffers can be independently sized.

Figure 3A:
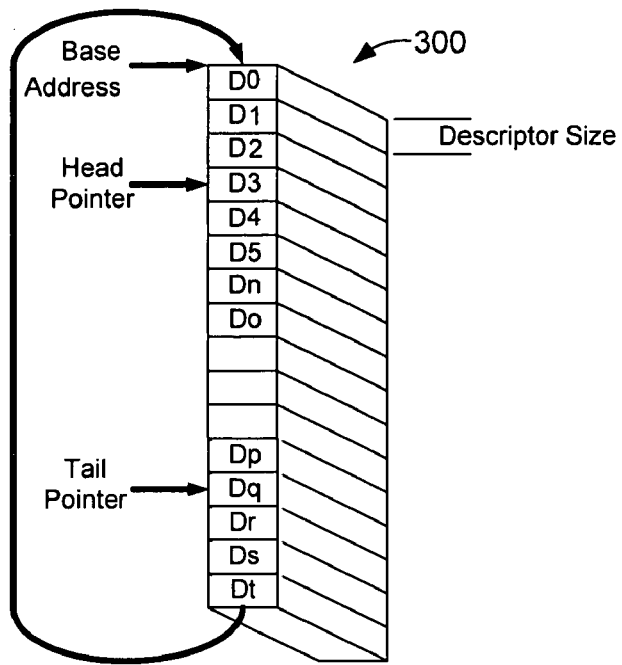
FIG. 3A shows a descriptor ring according to an embodiment.

FIG. 3A shows a descriptor ring 300 according to an embodiment. The receive DMA path (see, FIG. 2, ref. num. 210) implements the Rx descriptor ring (RDR), while the transmit DMA path (see, FIG. 2, ref. num. 212) implements the Tx descriptor ring (TDR). The descriptor ring 300 is a circular control structure with 8, 16 or 32 elements. Each element corresponds to a 128B, 256B or 512B buffer. Master descriptor rings reside in the system memory. Shadow descriptor rings, which are copies of the master descriptor rings, reside in the EP device hardware. Hardware access to the descriptor ring structure is based on values of the Head and Tail pointers. Head pointer and tail pointer definitions for Rx and Tx operations according to an embodiment are given in Table 10.

TABLE 10

An Exemplary 64-bit Descriptor Structure

| | Rx/Upstream Data Movement Queue | Tx/Downstream Data Movement Queue |
|---|---|---|
| Head Pointer | Rx write process start address. Rx read process start point. Incremented by write process for each new frame presented by the media interface. When Head Pointer equals Tail Pointer then Rx write process stops. | Request and write process start address. Points to descriptor currently in use by the Tx write process. |
| Tail Pointer | Rx Write process limit address (end of free list). Rx Write process increments Head pointer until it reaches Tail pointer value. Rx Write process stops when it reaches Tail pointer value. Tail pointer value is updated (with PIO Write) as software processes buffer corresponding to descriptor ring elements. | Tx Write/request process limit address (end of free list). Request and Write processes stop when Head pointer is equal to Tail pointer value. To add to the list of free descriptors software updates Tail pointer continuously via PIO writes to the device. |

Transmit and receive queue buffers can be independently sized. In a particular embodiment, an 8-byte descriptor structure uses sequential 32-bit cache lines, which are commonly block aligned on most modern CPU architectures, such as INTEL™ 32-bit or 64-bit architecture, or FREESCALE™ POWERQICCII™ 32-bit architecture. A maximum of four descriptors can be accommodated in a 32-bit cache line.

Figure 3B:
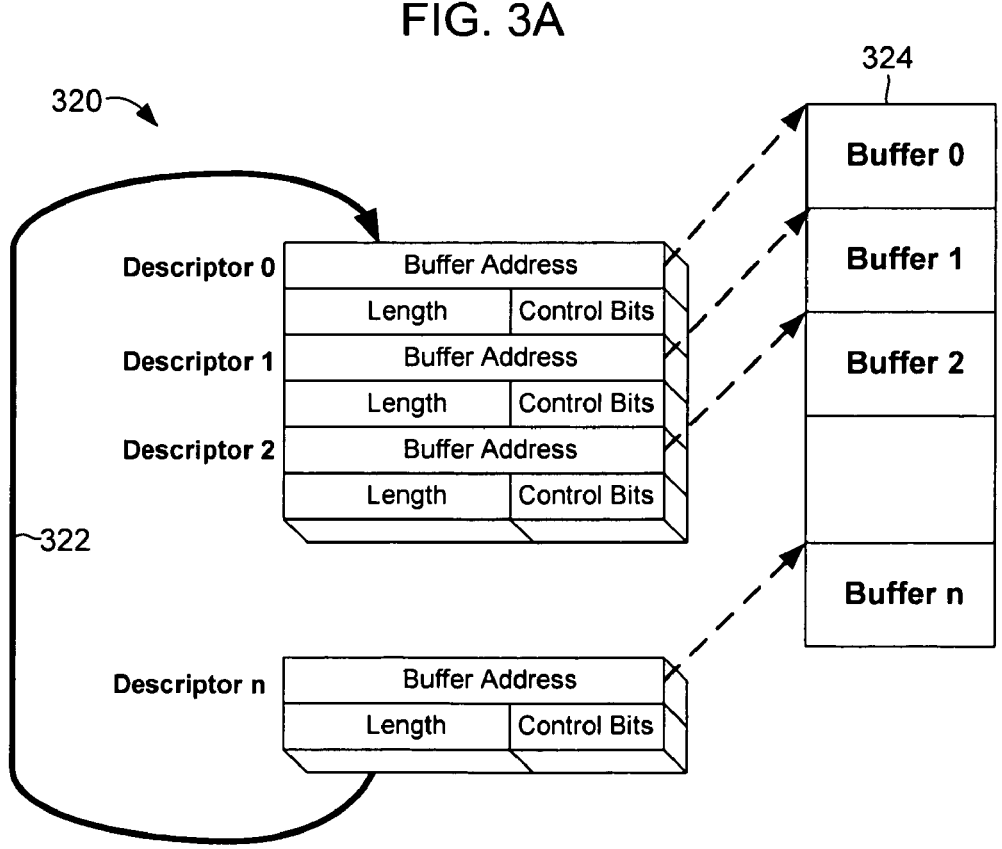
FIG. 3B is a diagram of a descriptor ring and buffers.

FIG. 3B is a diagram 320 of a descriptor ring 322 and buffers 324. Software initializes descriptor rings based of DMA device capabilities. During a descriptor READ operation, the bus mastering DMA EP device initiates transactions to initialize contents of the shadow descriptor rings (see FIG. 2, ref. nums 206, 208) with the contents of the corresponding master descriptor ring structure in the system memory. This operation is accomplished by initiating Non-Posted Transactions (e.g., memory READs) to the locations of the descriptor rings in the system memory, and updating the shadow descriptor ring structures with contents of the completion transactions (response) returned by the system memory controller. During a descriptor WRITE back operation, the bus mastering DMA EP device periodically initiates transactions to update contents of the master descriptor ring data structures in the system memory with contents of shadow descriptor ring structure(s). This operation is accomplished using a Posted transaction (Memory WRITE) that transfers whole or parts of the descriptor ring that has been updated by the EP device hardware.

Figure 3C:
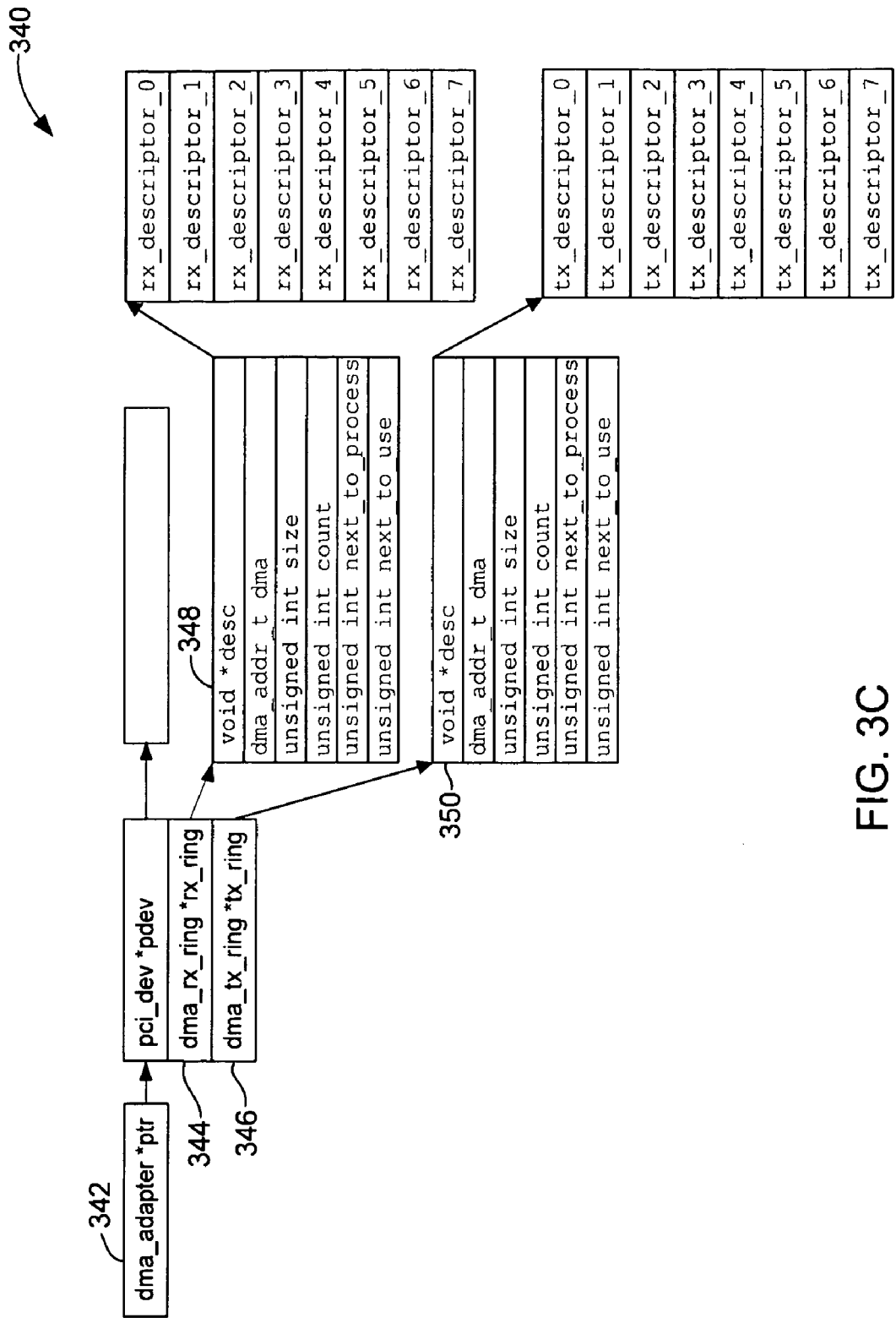
FIG. 3C is a diagram of a descriptor ring data structure according to an embodiment.

FIG. 3C is a diagram of a descriptor ring data structure according to an embodiment. The data structure is organized in the host CPU memory and is allocated and initialized when the bus mastering device driver loads. The dma_adapter 342, dma_rx_ring 344, and dma_tx_ring 346 structures are allocated using a vmalloc( ) dynamic memory allocation routine, as is known in the art of LINUX operating systems. The dma_tx_ring 346 and dma_rx_ring 344 structures point to the descriptor rings (void *desc) 348, 350. These descriptor rings are to allocated using the "consistent DMA mapping" for which the hardware guarantees that both the DMA device (endpoint device) and the CPU can access the data concurrently and will see updates made by each other without requiring any explicit software flushing. The following is an example of a system call that can be used to allocate a consistent DMA region for descriptor rings in the host CPU's non-pageable memory region:

dma_addr_t dma;
void *desc=pci_alloc_consistent(dev, size, &dma);
where:
desc is the Virtual address used by CPU to access this memory region.
dev is a struct pci_dev *.
size is the length descriptor ring (64B as shown in FIGS. 3-2).
dma is address used by bus mastering DMA device to access this region (Physical address).

Upon device driver initialization, the bus master DMA device will receive DMA start addresses for both the dma_tx_ring and dma_rx_ring structures. This information will be used to initiate the descriptor write-back process during DMA operation.

Figure 3D:
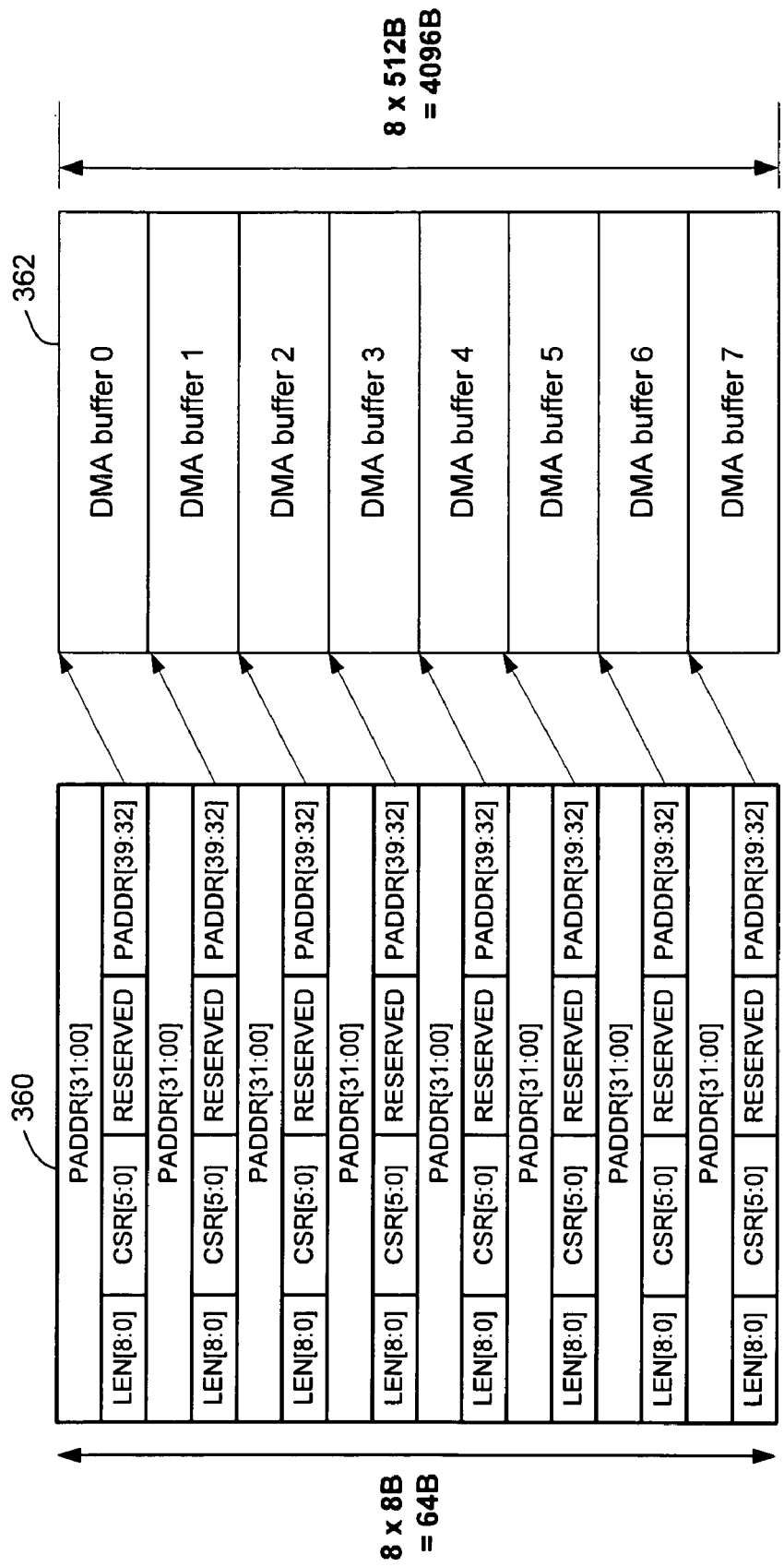
FIG. 3D shows the relationship between the descriptor ring and the DMA buffers located in the host CPU non-pageable memory region.

FIG. 3D shows the relationship between the descriptor ring 360 and the DMA buffers 362 located in the host CPU nonpageable memory region. In case of an Rx descriptor ring, these buffers are destination of data content of Upstream/Rx Memory WRITE TLPs. While in the case of the Tx descriptor ring, these buffers are the source of data content of the Downstream/Tx Completion TLPs. The following system call can be used to allocate a consistent DMA region for descriptor rings in the host CPU's non-pageable memory region:

dma_addr_t paddr;
void *buffer=pci_alloc_consistent(dev, size, &paddr);
where:
buffer: is the Virtual address used by CPU to access this memory region.
dev: is a struct pci_dev *.
size: is the length of DMAble buffer region (e.g. 8*(128B, 256B or 512B) in this case).
paddr: is address used by bus mastering DMA device to access this region (Physical Address).

The physical address ("paddr") returned above represents the start of DMA enabled memory region. Depending upon the size of the buffers supported (128B, 256B or 512B), individual descriptor table element PADDR fields will be updated. Upon device driver initialization, the bus master DMA device will receive buffer start addresses for both the dma_tx_ring and dma_rx_ring structures. This information will be used for memory READ and WRITE operations.

PCI Message Signaling Interrupt (MSI) is used to minimize host CPU overhead and achieve higher performance DMA operation. After a descriptor write-back is complete for either the upstream or the downstream queue, a MSI message is initiated from the bus master DMA Endpoint. Receipt of a MSI message makes the CPU execute a predefined Interrupt Sub-Routine (ISR). This ISR is used to get CPU's attention and service the bus master DMA device. In a particular embodiment, the following call will setup the ISR:

The request_irq( )function requests that a specified function (the handler) be called whenever the kernel receives a given interrupt.
unsigned int irq=dma_adapter→dev→irq;
int ret=request_irq(irq, &my_isr, unsigned long irqflags, const char *devname,
void *dev_id);

where:
my_isr is:
irq_return_t my_isr (int irq, void *data, struct pt_regs *regs)
{
...
...
}

During a device driver initialization, the device driver will first release a TX/RXRST flag. The device driver will allocate and initialize dma_tx_ring, dma_rx_ring and buffer structures based on the TX/RXNUMDR and TX/RXMPS that is supported. The device driver will then transfer these values via PIO writes to the hardware. The device driver will then assert TX/RXPDUN and wait for TX/RXDDUN to be asserting signaling completion of descriptor read operation. The device driver will then assert TX/RXEN to start the DMA operation. The following operations are performed within the ISR for Rx/upstream data movement:

```
RX_PROCESS {
process_count=0;
i=rx_ring→next_to_process;
rx_desc=&rx_ring.desc[i];
while (rx_desc->flags.csr.DRDY) {
   copy_buf_to_user_space    ({rx_desc→buf_addr_h,
      rx_desc→buf_addr_l},
      rx_desc→len);
   process_count++;
   if (++i==rx_ring→count) i=0;
   if (process_count=>BUF_RETURN_THRESHOLD) {
      j=rx_ring→next_to_use;
      while (process_count--) {
         rx_desc2=&rx_ring.desc[j];
         if (++j==rx_ring→count) j=0;
         cleanup_buf_in_userspace( );
      }
      process_count=0;
   }
   if (rx_ring→next_to_use !=j) {
      rx_ring→next_to_use=j;
      if (j--==0)j=(rx_ring→count-1);
      PIO_WRITE (j, RXDRT);
   }
   rx_desc=&rx_ring.desc[i];
}
rx_ring→next_to_process=i;
}
```

When data is to be moved upstream, the following function call is made:
my_rx_frame( ) {
1. Disable by setting DEV_CSR[MSI_ENABLE]=0.
2. Disable Rx descriptor processing by setting DEV_CSR [RX_ENABLE]=0.
4. DEV_CSR[RX_TAIL_POINTER]=x, where x is the descriptor number for the first descriptor where data needs to be received.
5. DEV_CSR[TX_HEAD_POINTER]=y, where y is one more than the descriptor number for the last descriptor where data needs to be received.
6. Enable MIS generation by setting DEV_CSR[MSI_ENABLE]=1.
7. Enable Rx descriptor processing by setting DEV_CSR [RX_ENABLE]=1.
}

Upstream/Rx data movement is accomplished when an MSI interrupt is received from the bus master device:
irq_return_t my_isr (int irq, void *data, struct pt_regs *regs) {
1. Disable MSI generation by setting DEV_CSR [MSI_ENABLE]=0.
2. Process the dma_rx_ring and dma_tx_ring structures. Move data received in the associated DMA buffers to application domain storage.
3. Enable MIS generation by setting DEV_CSR[MSI_ENABLE]=1.
}

When data is to be moved downstream, a function call is made:
my_tx_frame( ) {
1. Disable MSI generation by setting DEV_CSR [MSI_ENABLE]=0
2. Disable Tx descriptor processing by setting DEV_CSR [TX_ENABLE]=0
3. Update transmit buffers data to be transmitted. This involves moving data from application domain to Tx descriptor buffers.
4. DEV_CSR[TX TAIL_POINTER]=x, where x is the descriptor number for the first descriptor whose buffer needs to be transmitted.
5. DEV_CSR[TX_HEAD_POINTER]=y, where y is one more than the descriptor number for the last descriptor whose buffer needs to be transmitted.
6. Enable MIS generation by setting DEV_CSR[MSI_ENABLE]=1.
7. Enable Tx descriptor processing by setting DEV_CSR [TX_ENABLE]=1.
}

Figure 4A:
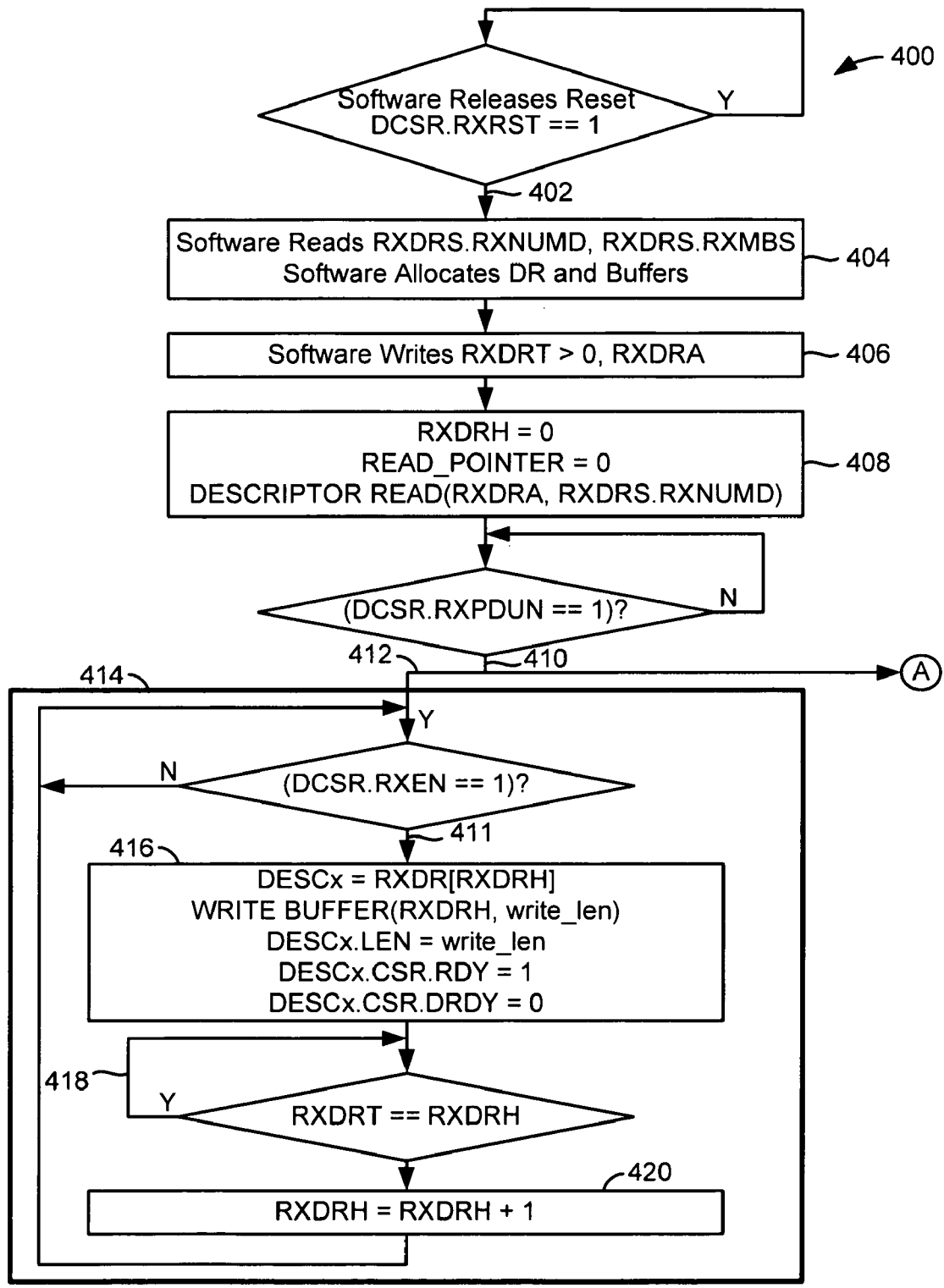
FIGS. 4A and 4B show a flow chart of a receive ("Rx") data movement process in a PCI Express system according to an embodiment.
Figure 4B:
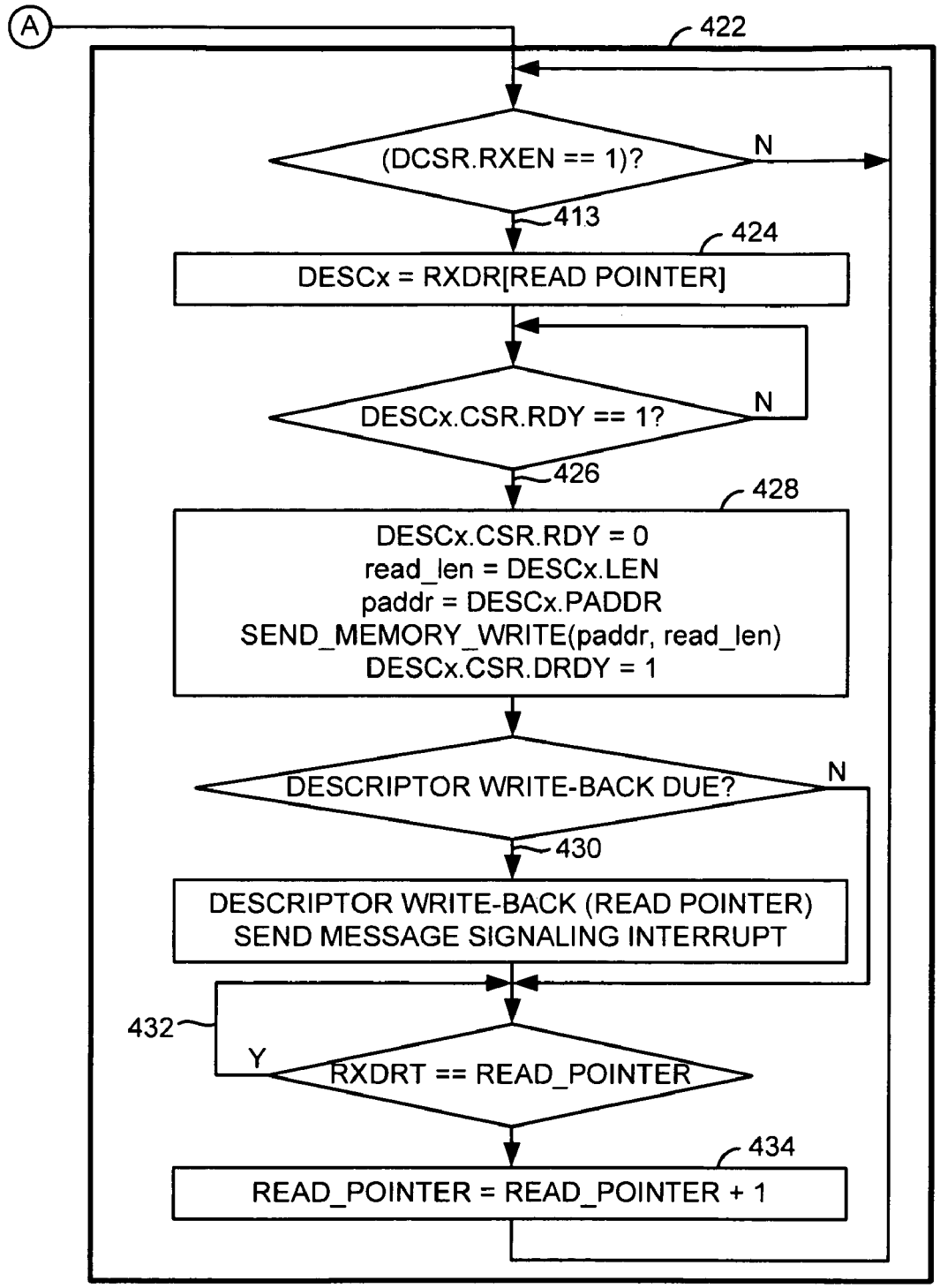
Figure 5A:
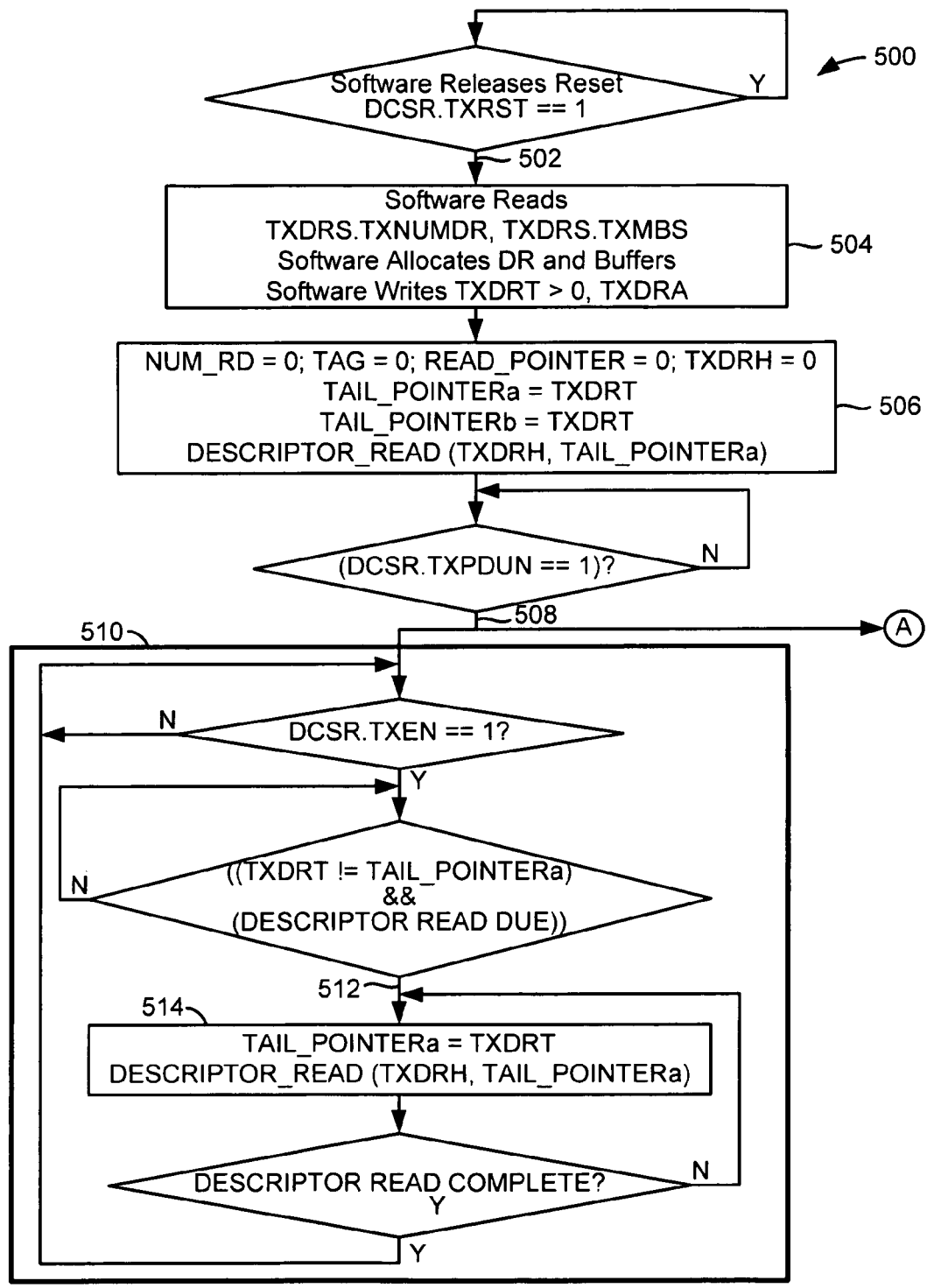
FIGS. 5A-5D show a flow chart of a transmit ("Tx") data movement process in a PCI Express system according to an embodiment.
Figure 5B:
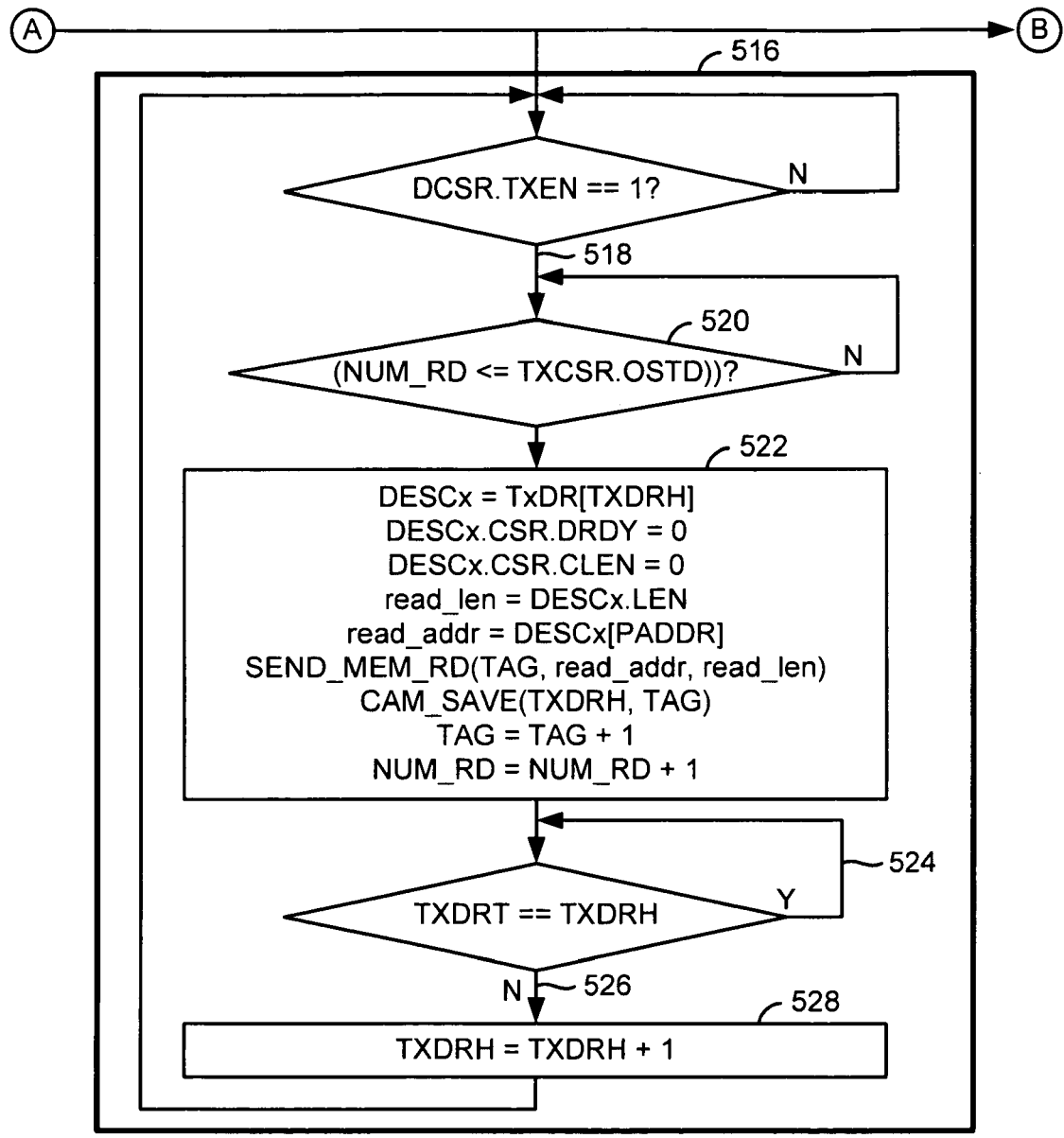
Figure 5C:
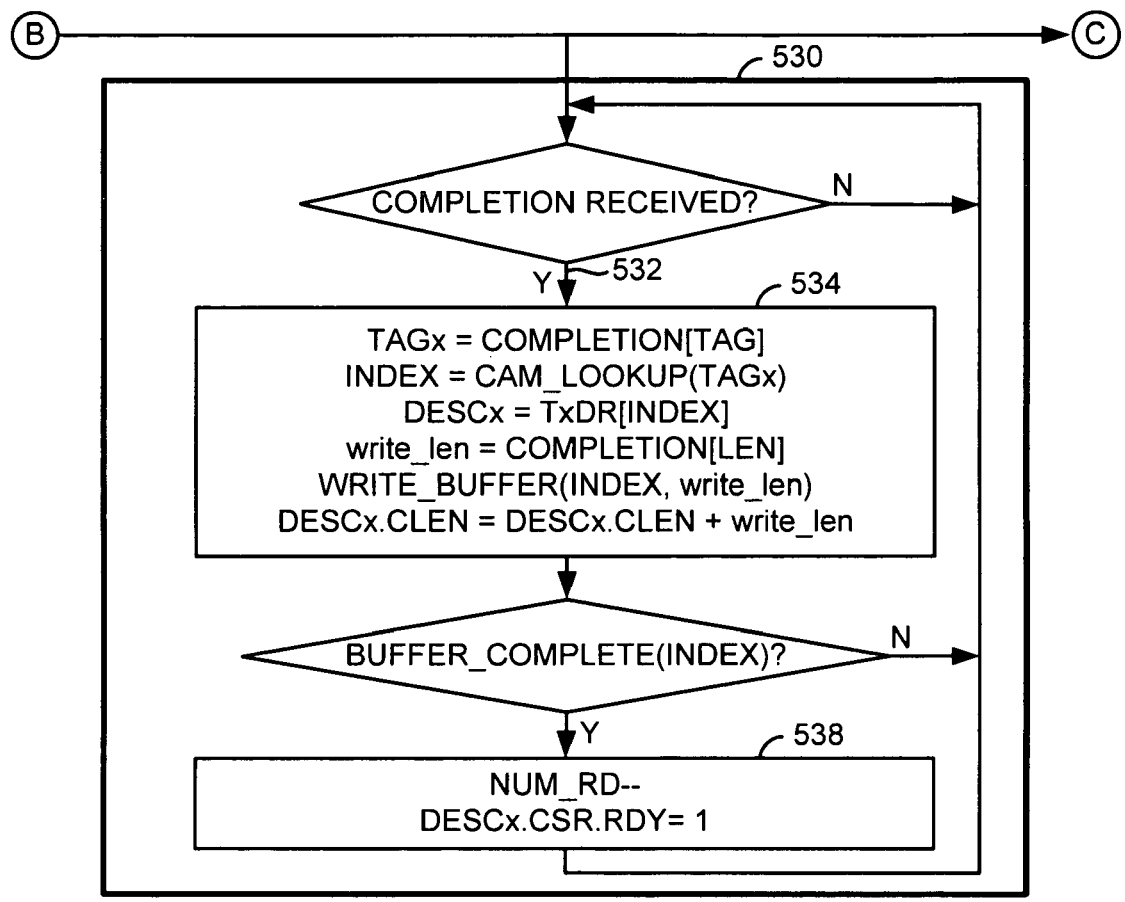
Figure 5D:
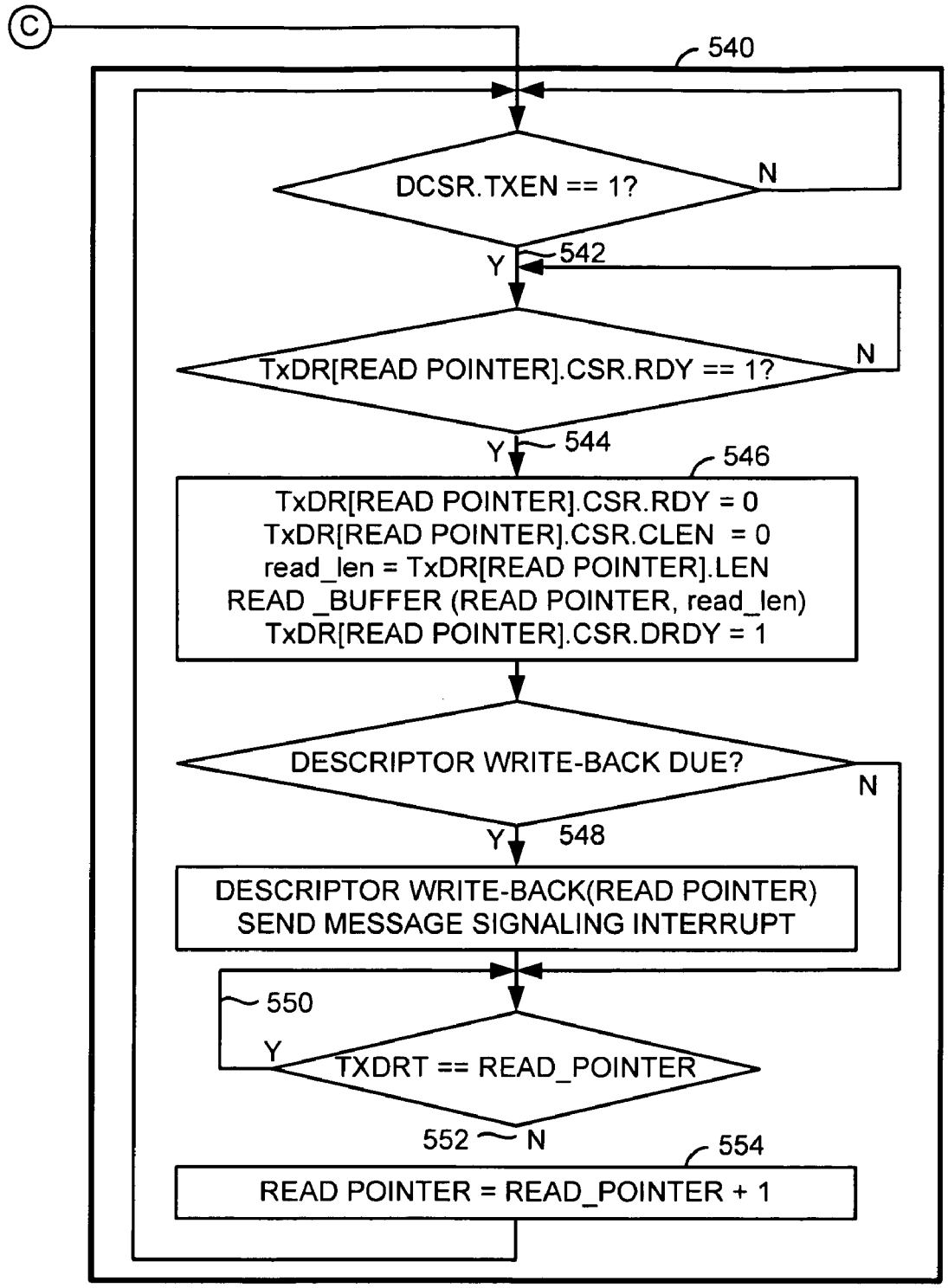

FIGS. 4A and 4B show a flow chart of a receive ("Rx") data movement process 400 in a PCI Express system according to an embodiment. Software releases reset by setting DCST.RXRST=0 (branch 402). Software reads RXDRS.RXNUMD (Number of Entries in the receive descriptor ring (DR)) and RXDRS.RXMBS (size of the buffer associated with each receive descriptor), so that it can allocate descriptor ring data structure and the associated Rx data buffers in the system memory (step 404). Software writes RXSRTRXDRT (Rx DR Tail Pointer) (must be set to greater than >0) and updates the RXDRA (Rx DR Address) registers (step 406). FPGA hardware initiates a descriptor READ based on programming of the RXDRA registers and RXDRS.RXNUMD value, thereby making a copy of the DR structure in FPGA hardware (step 408). Hardware sets DCSR.RXPDUN when Rx DMA descriptor read process is complete (branch 410). Hardware checks if DCSR.RXEN is set indicating that software has enabled Rx DMA operation (branches 411, 413). In an alternative embodiment, these branches are combined in the flow from branch 410 prior to the process branching.

In a WRITE Process (branch 412), a WRITE BUFFER function (414) writes payload data frame into the data buffer associated with the descriptor element pointed to by the current value of RXDRH. Descriptor element field LEN is updated to the actual buffer length in bytes and CSR.RDY bit is set signaling that the data is ready (step 416).

If the value of current RXDRH is equal to RXDRT (branch 418), then wait for software to update RXDRT before proceeding to increment RXDRH (step 420), so that the next available buffer can be filled.

In a RECEIVE (READ) process (branch 422), a check is performed to see if DCSR.RXEN is set (branch 413) indicating that software has enabled Rx DMA operation. (Note, only one branch 414, 422 (i.e., only a WRITE operation or only a READ operation) is typically set at a time.) Use READ_POINTER to index into the DR (step 424) to check if the corresponding descriptor's CSR.RDY is set (branch 426), indicating that the associated buffer is ready for transmission. When the buffer is ready, SEND_MEMORY_WRITE function (step 428) sends the buffer content packaged up as one or more Memory WRITE transaction layer packets ("TLPs"). The Memory WRITE TLPs use PADDR and LEN fields from the descriptor. To indicate that the associated buffer has been transmitted, the corresponding CSR.DRDY is set. CSR.DRDY bit will be used by the software to process these descriptors.

A check is performed to determine if WRITE-back is due (branch 430). This occurs under two conditions. The first condition is if the READ_POINTER equals RXDRT (branch 430) and READ_POINTER has advanced a predetermined amount since the last descriptor WRITE-back. The second condition is if the READ_POINTER has advanced a predetermined amount since the last descriptor WRITE-back. If either condition is met, then a description WRITE-back operation is performed.

A chunk of memory corresponding to descriptor elements pointed to by the previous READ_POINTER to the one pointed to by the current READ_POINTER will be written to the main memory. This overwrites the corresponding master descriptor area and transfers information about buffers that are ready to be processed in the system memory. An interrupt is sent to the CPU (step 436). If the value of current READ_POINTER is equal to RXDRT (branch 432), then wait for software to update RXDRT, before proceeding to increment RXDRH (step 434). In a particular embodiment, the logic for implementing the process of FIGS. 4A and 4B is incorporated in an endpoint of an FPGA. The configurable nature of FPGAs allows defining the on-chip PCI Express system according to FIGS. 4A and 4B.

The chunk of memory indicated by the read pointer is written to main memory much faster than a similar WRITE operation in a conventional PCI Express system where the chunk would be written to I/O memory. The read pointer alerts the CPU that the endpoint has sent data that is saved directly to main memory without polling I/O memory. This saves latency in an FPGA PCI Express environment because of the need to make logic in the FPGA, which is generally parallel pipelined logic, meet the timing requirements of the serial PCI Express link, which typically runs at a fixed speed. In a conventional FPGA PCI Express system, latencies are added to the operation of the FPGA (e.g. flip-flops, look-up tables, and switching fabric), which gives rise to bus timing constraints. ASICs are not generally restricted by switching fabric processing limits, and often work at a fixed speed, such as 250 MHz or 400 MHz.

FIGS. 5A-5D show a flow chart of a transmit ("Tx") data movement process 500 in a PCI Express system according to an embodiment. Software releases reset by setting DCST.TXRST=0 (branch 502). Software reads RXDRS.TXNUMD (Number of Entries in the Tx DR) and RXDRS.TXMBS (size of the buffer associated with each transmit descriptor) so that it can allocate descriptor ring data structure and the associated Rx data buffers in the system memory and software writes TXSRT (Tx DR Tail Pointer) (must be set to greater than 0) and RXDRA (Tx DR Address) registers (step 504). Hardware initiates a descriptor READ based on programming of the TXDRA registers and RXDRS.TXNUMD values, thereby making a copy of the DR structure in FPGA hardware. Local variables associated with the Tx process are initialized to their quiescent values and sets DCSR.TXPDUN when Tx DMA descriptor read process is complete (step 506).

Hardware checks if DCSR.TXEN is set (branch 508) indicating that software has enabled Tx DMA operation. If software has updated TXDRT and TXDRT has advanced a predetermined amount since the last descriptor READ (branch 512); then a descriptor READ operation is initiated (sub-process 510). A chunk of memory corresponding to descriptor elements pointed to by the previous TXDRT to the one pointed to by the current TXDRT will be read from the main memory into a shadow descriptor ring in the FPGA. This overwrites the corresponding shadow descriptor ring locations. This has the effect of transferring descriptor information about buffers that are ready to be transmitted in the system memory (step 514).

If a Tx memory READ process is active (sub-process 516) is initiated. Software releases reset by setting DCST.TXRST=0 (branch 518). A check is performed to see whether there are any outstanding transmission requests by checking to see if the NUM_RD is within TXCSR.OSTD (step 520), which limits the maximum number of Memory Reads that can be outstanding at any given time.

If a transmission operation is allowed, the LEN and PADDR from the local descriptor element corresponding to the current TXDRH. SEND_MEM_RD are extracted to create a Memory Read TLP for transmission and a TAG is assigned to the Memory Read TLP. The TAG is associated with the current TXDRH in a Content Addressable Memory (CAM) and NUM_RD is also incremented to track the outstanding request (step 522). If the value of current TXDRH is equal to TXDRT, then wait (branch 524) for software to update TXDRT before proceeding to increment TXDRH (branch 526, step 528).

Completion of the Tx process initiates sub-process 530 when a completion flag, which in a particular embodiment is a TLP tag, is received by the EP device from the CPU (branch 532). Based on the TLP Tag field of the received Completion TLP, a lookup is performed in the content addressable memory ("CAM"). The descriptor index is retrieved from the CAM and then the descriptor from TX descriptor ring. WRITE_BUFFER stores the completion TLP payload content into a buffer associated with the descriptor, and GLEN is updated with the length of the payload associated with the Completion (step 534). If GLEN==LEN the all split Completion TLP for a given Read request have been received and the corresponding buffer is ready for transmission. CSR.RDY is set to indicate to the Data Download process that the buffer was ready to be drained. NUM_RD is decremented to account for the complete receipt the memory read request (step 538).

The data download process (sub-process 540) DMA is enabled when the software releases reset by setting DCSR.TXEN==1 (branch 542). The maturity of the Tx buffer (i.e., whether the buffer associated with the description is ready for extraction) is checked by seeing if CSR.RDY is set for the descriptor extracted from the DR using the READ_POINTER (step 544). If CSR.RDY is set then the buffer associated with the descriptor is ready for extraction. The descriptor corresponding to the READ_POINTER value is extracted and READ BUFFER function extracts the corresponding buffer for transmission. CSR.DRDY field is set on the descriptor to inform software that the buffer corresponding to the descriptor has been transmitted and are free for reuse (step 546).

WRITE-back is due (branch 548) if either of two conditions are met. The first condition is if READ_POINTER equals TXDRT and READ_POINTER has advanced a predetermined amount since the last descriptor write-back. The second condition is if READ_POINTER has advanced a predetermined amount since the last descriptor write-back. If either condition is met, then WRITE-back of the descriptor is performed. During WRITE-back, a chunk of memory content corresponding to descriptor elements pointed to by the previous READ_POINTER to the one pointed to by the current READ_POINTER will be written to the main memory. This overwrites the corresponding master descriptor area. This has the effect of transferring information to the software about buffers that have been transmitted by hardware. If the value of current READ_POINTER is equal to TXDRT (branch 550), then wait for software to update RXDRT before proceeding to increment RXDRH (branch 552, step 554).

Figure 6:
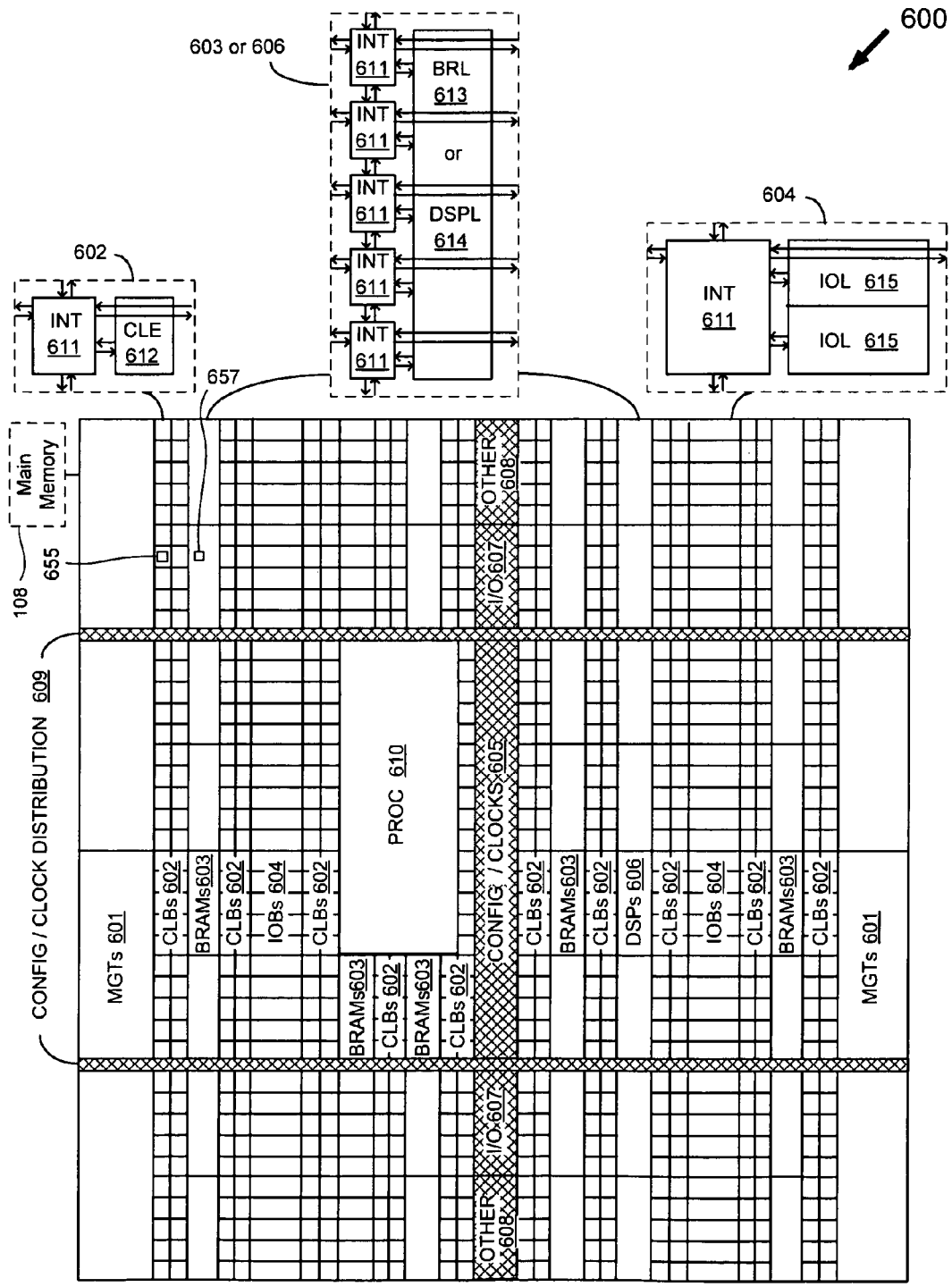
FIG. 6 is a plan view of an FPGA configured according to an embodiment.

FIG. 6 is a plan view of an FPGA 600 configured according to an embodiment. The FPGA 600 includes CMOS portions in several of the functional blocks, such as in RAM and logic, and is fabricated using a CMOS fabrication process. The FPGA is configured with an application including a PCI Express system that transfers data between components of the FPGA and optionally off-chip components. The PCI Express system includes at least one DMA EP device 655 instantiated in a configurable logic block CLB 602 having I/O memory 657 instantiated in a block RAM 603. Data is transferred between main memory 108 (see also, FIG. 1A, ref. num. 108) and the EP device 655 without necessarily going through I/O memory 657; thus, the CPU does not need to poll I/O memory 657. Main memory 108 is represented with a dashed line to indicate it is not part of the FPGA 600.

The FPGA architecture includes a large number of different programmable tiles including multi-gigabit transceivers (MGTs 601), configurable logic blocks (CLBs 602), random access memory blocks (BRAMs 603), input/output blocks (CLBs 604), configuration and clocking logic (CONFIG/CLOCKS 605), digital signal processing blocks (DSPs 606), specialized input/output blocks (I/O 607) (e.g., configuration ports and clock ports), and other programmable logic 608 such as digital clock managers, analog-to-digital converters, system monitoring logic, and so forth. Some FPGAs also include dedicated processor blocks (PROC 610).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element (INT 611) also includes the connections to and from the programmable logic element within the same tile, as shown by the examples included at the top of FIG. 6.

For example, a CLB 602 can include a configurable logic element (CLE 612) that can be programmed to implement user logic plus a single programmable interconnect element (INT 611). A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element (INT 611). As will be clear to those of skill in the art, the actual I/O pads connected, for example, to the I/O logic element 615 are manufactured using metal layered above the various illustrated logic blocks, and typically are not confined to the area of the input/output logic element 615. In the pictured embodiment, a columnar area near the center of the die (shown shaded in FIG. 6) is used for configuration, clock, and other control logic.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of user logic.

The following listing provides examples of a PCI Express bus mastering DMA device drivers suitable for use in an embodiment in a RED HAT™ LINUX™ implementation. The listing includes a DMA Adapter Structure, a Transmitter Description Container, a Receiver Descriptor Container, and a DMA Descriptor:

I. DMA Adapter Structure:
```
struct dma_adapter {
    /* PCI device */
    struct pci_dev *pdev;
    /* Receive and transmit descriptor rings */
    struct dma_rx_ring *rx_ring;
    struct dma_tx_ring *tx_ring;
};
```

II. Transmitter Descriptor Container:
```
struct dma_tx_ring {
    /* pointer to the descriptor ring memory */
    void *desc;
    /* physical address of the descriptor ring */
    dma_addr_t dma;
    /* length of descriptor ring in bytes */
    unsigned int size;
    /* number of descriptors in the ring */
    unsigned int count;
    /* Next descriptor to be processed by software */
    unsigned int next_to_process;
    /* Next descriptor to be used by hardware */
    unsigned int next_to_use;
};
```

III. Receiver Descriptor Container:
```
struct dma_rx_ring {
    /* pointer to the descriptor ring memory */
    void *desc;
    /* physical address of the descriptor ring */
    dma_addr_t dma;
    /* length of descriptor ring in bytes */
    unsigned int size;
    /* number of descriptors in the ring */
    unsigned int count;
    /* Next descriptor to be processed by software */
    unsigned int next_to_process;
    /* Next descriptor to be used by hardware */
    unsigned int next_to_use;
};
```

IV. DMA Descriptor:
```
struct dma_desc {
    /* lower physical address of data buffer */
    uint32_t buf_addr_l;
```

```
union {
uint32_t data;
struct {
    /* data buffer length */
    uint32_t len: 9;
    /* control and status registers */
    uint32_t csr: 6;
        /* reserved field */
    uint32_t resry: 9;
    /* upper physical address of data buffer */
    uint32_t buf_addr_h: 8;
} flags;
};
```

What is claimed is:

1. An integrated circuit ("IC"), comprising:
a peripheral component interconnect express ("PCIe") root complex having a central processing unit ("CPU"), a memory controller configured to control a main memory of a PCIe system, and a PCIe port;
a PCIe switch; and
a PCIe endpoint device coupled to the PCIe root complex through the PCIe switch, the PCIe endpoint device configured to initiate data transfer between the main memory and the PCIe endpoint device;
wherein the PCIe endpoint device includes a slave interface configured to enable the CPU to monitor data transfer between the PCIe endpoint device and main memory and a master interface including a READ direct memory access ("DMA") engine and a TRANSMIT DMA engine, and
wherein the READ DMA engine comprises a RECEIVE descriptor ring and the TRANSMIT DMA engine comprises a TRANSMIT descriptor ring.

2. The IC of claim 1, wherein the PCIe endpoint is a direct memory access ("DMA") endpoint device including an endpoint buffer and logic to initiate autonomous data transfer between the endpoint buffer and the main memory.

3. The IC of claim 1, wherein the PCIe endpoint device is configured to issue a transaction layer packet ("TLP") to initiate data transfer between the PCIe endpoint device and main memory.

4. The IC of claim 1, wherein the PCIe endpoint device is configured to issue a memory READ transaction layer packet ("TLP") to query a block having a selected number of bytes in the main memory.

5. The IC of claim 4, wherein the selected number of bytes is defined in a memory READ descriptor generated by the PCIe endpoint.

6. The IC of claim 1, wherein the PCIe endpoint device is configured to issue a memory WRITE transaction layer packet ("TLP") defining a selected number of bytes and an address in the main memory.

7. The IC of claim 6, wherein the number of bytes is defined in a WRITE descriptor generated by the PCIe endpoint.

8. The IC of claim 1, further comprising a shadow RECEIVE descriptor ring and a shadow TRANSMIT descriptor ring.

9. The IC of claim 1, wherein the PCIe endpoint device is configured in a field-programmable gate array.

10. The IC of claim 9, wherein the PCIe endpoint device is configured in a configurable logic block of the field-programmable gate array and I/O memory for the PCIe system is allocated in block random access memory of the field-programmable gate array.

11. A method of transferring data in a peripheral component interconnect express (PCIe) system of an IC, comprising:
generating a data transfer instruction in a PCIe endpoint device of the PCIe system;
wherein the PCIe endpoint device includes a slave interface and a master interface including a READ direct memory access ("DMA") engine and a TRANSMIT DMA engine;
wherein the READ DMA engine comprises a RECEIVE descriptor ring and the TRANSMIT DMA engine comprises a TRANSMIT descriptor ring;
transmitting the data transfer instruction to a memory controller of the PCIe system;
enabling the CPU to monitor data transfer between the PCIe endpoint device and main memory of the PCIe system by the slave interface; and
transferring data between a buffer in the PCIe endpoint device and the main memory;
wherein the transferring of data includes referencing entries in the RECEIVE descriptor ring in transmitting data from the PCIe endpoint device to the main memory and referencing entries in the TRANSMIT descriptor ring in transmitting data from the main memory to the PCIe endpoint device.

12. The method of claim 11, wherein the IC is a field-programmable gate array ("FPGA") and further comprising, before generating the data transfer instruction, configuring a portion of a configurable logic block of the FPGA to generate the data transfer instruction.

13. The method of claim 12, wherein the data transfer instruction is a direct memory access command.

14. The method of claim 11, wherein the data transfer instruction comprises a transaction layer packet ("TLP").

15. The method of claim 14, wherein the PCIe endpoint device generates the TLP including a number of data bytes and an address in the main memory.

16. The method of claim 14, wherein the TLP generated in the PCIe endpoint device is transmitted from the PCIe endpoint device through the memory controller to the main memory.

17. The method of claim 11, further comprising, after transferring data between the buffer and main memory,
generating a completion TLP in the memory controller; and
transmitting the completion TLP from the memory controller to the PCIe endpoint.

18. The method of claim 11, wherein transferring the data between the buffer in the PCIe endpoint device and main memory of the IC comprises transferring data from the buffer to a selected address in main memory specified in a WRITE transaction layer packet and further comprising,
updating targeted main memory locations in the memory controller.

* * * * *